Figure 1:
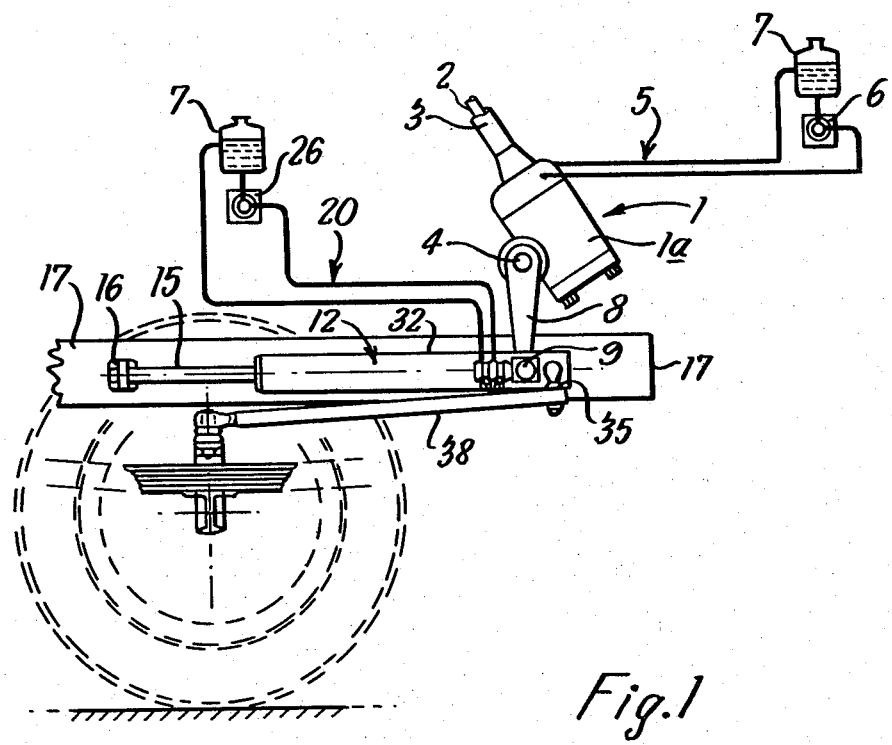

United States Patent [19]

Turner

[11] 4,365,684
[45] Dec. 28, 1982

[54] POWER ASSISTED GEAR ASSEMBLY

[75] Inventor: Robert Turner, Rayleigh, England

[73] Assignee: Cam Gears Limited, Hertfordshire, England

[21] Appl. No.: 171,340

[22] Filed: Jul. 23, 1980

[30] Foreign Application Priority Data

Jul. 23, 1979 [GB] United Kingdom ............... 7925593

[51] Int. Cl.³ .............................................. B62D 5/08
[52] U.S. Cl. ...................................... 180/133; 91/510; 91/517; 180/141
[58] Field of Search ............... 180/132, 133, 141, 149, 180/152, 162, 321; 91/510, 512, 517, 518

[56] References Cited

U.S. PATENT DOCUMENTS 3,602,326 8/1971 Garrison ............................. 180/133
3,990,534 11/1976 Weisgerber ......................... 180/132
4,013,138 3/1977 McBurnett .......................... 180/133
4,206,827 6/1980 Adams ................................ 180/132

FOREIGN PATENT DOCUMENTS 2352375 4/1975 Fed. Rep. of Germany ...... 180/141
1452715 9/1966 France ................................ 180/132

Primary Examiner—Robert R. Song
Assistant Examiner—Donn McGiehen
Attorney, Agent, or Firm—Yount & Tarolli

[57] ABSTRACT

A power assisted steering gear assembly having a first fluid system 5 comprising a first pressure operated device such as a double acting piston and cylinder, a first valve for controlling fluid flow to the first pressure operated means in response to a steering input in shaft 2 and a first fluid pump 7. The first pressure operated means can be a conventional power assisted steering gear 1 imparting rotation to a drop arm 8. A second fluid system 20 comprises second valve means controlling fluid flow from a second pump 26 to a second piston and cylinder device incorporated in a ram unit 12. The second valve in the ram unit 12 is responsive to displacement of the drop arm 8 and reacts to determine power assistance provided by the system 20 to a steering maneuver, such power assistance being additional to that provided by the system 5. Displacement of the ram unit 12 controls movement of a steering linkage through drag link 38. In a modification the system 20 can include an auxilliary valve which is responsive to fluid pressure in the system 5 so that when that pressure attains a predetermined value the auxilliary valve reacts to render ineffective power assistance from the ram unit 12. In the event of fluid pressure failure in the system 5 the auxilliary valve reacts to restore pressure fluid to the ram unit 12 and provide power assistance in the system 20.

10 Claims, 3 Drawing Figures

POWER ASSISTED GEAR ASSEMBLY

DESCRIPTION

This invention relates to a power assisted steering gear assembly.

It is well known in the art of power assisted steering gears to provide a fail-safe arrangement whereby the gear reverts to wholly manual steering in the event that the power assistance fails. With heavy, usually commercial, vehicles it is most desirable and in some cases regulations are in force which require that the vehicle can be steered without excessive steering torques being required even in the event of a failure of the power assistance. However, as the front axle weight of commercial vehicles increases it is found that excessive steering torques are necessary should the power assistance fail and the steering gear reverts to manual operation—in fact in many cases the steering may be found to be impractical in the event that the system reverts to wholly manual. In an attempt to alleviate the likelihood of a complete failure in power assistance for steering it has been proposed to provide duplicated power systems which operate simulataneously in response to a steering manoeuvre and are arranged so that should one system fail the other system will still give a measure of power assistance to a steering manoeuvre and it is an object of the present invention to provide an improved power assisted steering gear assembly with duplicate power assistance systems of which one of the systems will provide power assistance steering in the event of a failure in the other system.

According to the present invention there is provided a power assisted steering gear assembly comprising a displaceable component, displacement of which by a steering gear and in response to a steering input effects displacement of a steering linkage to provide a steering output; first fluid pressure operated means associated with the displaceable component; first valve means which is responsive to the steering input and regulates fluid flow from a first fluid pressure source to the first pressure operated means to provide power assistance to displacement of the displaceable component; second fluid pressure operated means associated with the steering linkage, and second valve means which is responsive to displacement of the displaceable component to regulate fluid flow from a second fluid pressure source to the second pressure operated means and provide assistance or further assistance to displacement of the steering linkage.

The first fluid pressure operated means, the first valve means and the first pressure source can conveniently be in the form of a conventional power assisted steering gear where the displaceable component may be, for example, a rack bar link of a rack and pinion assembly or a drop arm link from a rack and sector or quadrant assembly where power assistance is effected through a double acting piston and cylinder or ram device associated with the assembly. By the present invention displacement of the displaceable member in response to a steering manoeuvre serves to control operation of the second valve means and thereby power assistance which may be afforded to displacement of the steering linkage by the second pressure operated means. This latter power assistance can be additional to that provided by the first fluid pressure operated means, however in the event that there is a failure in operation of the first fluid pressure operated means and the steering gear reverts to a wholly manual arrangement to effect displacement of the displaceable member then that displacement nevertheless will serve to control the power assistance which is provided by the second fluid pressure operated means.

In a preferred arrangement the first pressure operated means, the first valve means and the first fluid pressure source comprise a first fluid system; the second pressure operated means, second valve means and the second fluid pressure source comprise a second fluid system and one of these fluid systems includes an auxilliary valve which is responsive to a variable input so that when that input attains a predetermined value the auxiliary valve reacts to render ineffective the power assistance which is available in the fluid system in which the auxiliary valve is included. By this arrangement the auxiliary valve can serve to isolate and maintain ineffective, power assistance which can otherwise be provided by one of the fluid systems but which auxiliary valve can be operated as required to effect power assistance from its associated fluid system. For example the auxiliary valve can be manually or automatically controlled. With automatic control the auxiliary valve can be responsive to an input derived from transmission movements, gear selection or weight of the vehicle on the steerable road wheels so that the auxiliary valve reacts to provide power assistance from its associated fluid system when the aforementioned variable inputs attain predetermined characteristics. Preferably the auxiliary valve is responsive to a variable input which is derived from fluid pressure in the other fluid system (that is the fluid system which does not include the auxiliary valve) so that when that fluid pressure attains a predetermined valve the auxiliary valve reacts to render ineffective power assistance which is available from the fluid system with which it is associated; by this arrangement should there be a failure of fluid pressure in the aforementioned other fluid system the auxilliary valve can react automatically to introduce power assistance to the steering manoeuvre from the fluid system with which the auxilliary valve is associated. Preferably the auxilliary valve is included in the second fluid system.

The first valve means will usually be open centre in its neutral condition and a similar open centre valve is desirable for the second valve means; however bearing in mind the possibility that the second fluid pressure operated means and its associated fluid pressure system may be isolated and rendered ineffective as above described, it is desirable that the open centre second valve means is also open return so that fluid pressure chambers which may be associated with the second fluid pressure operated means (and which will provide power assistance when pressurised) communicate with exhaust (reservoir). The second fluid pressure operated means will usually be in the form of a double acting piston and cylinder device with opposed chambers to and from which fluid is directed by the second valve means, conveniently in the form of a displaceable spool under control of the displaceable component associated with the first fluid pressure operated means.

The steering linkage, displacement of which is power assisted by the assembly of the present invention can be of conventional form, for example the second pressure operated means can be coupled to a drag link in the steering linkage to impart movement to the drag link in response to displacement of the second pressure operated means by movement of the displaceable component and/or by operation of the second pressure operated means to provide power assistance under control of the second valve means.

Figure 2:
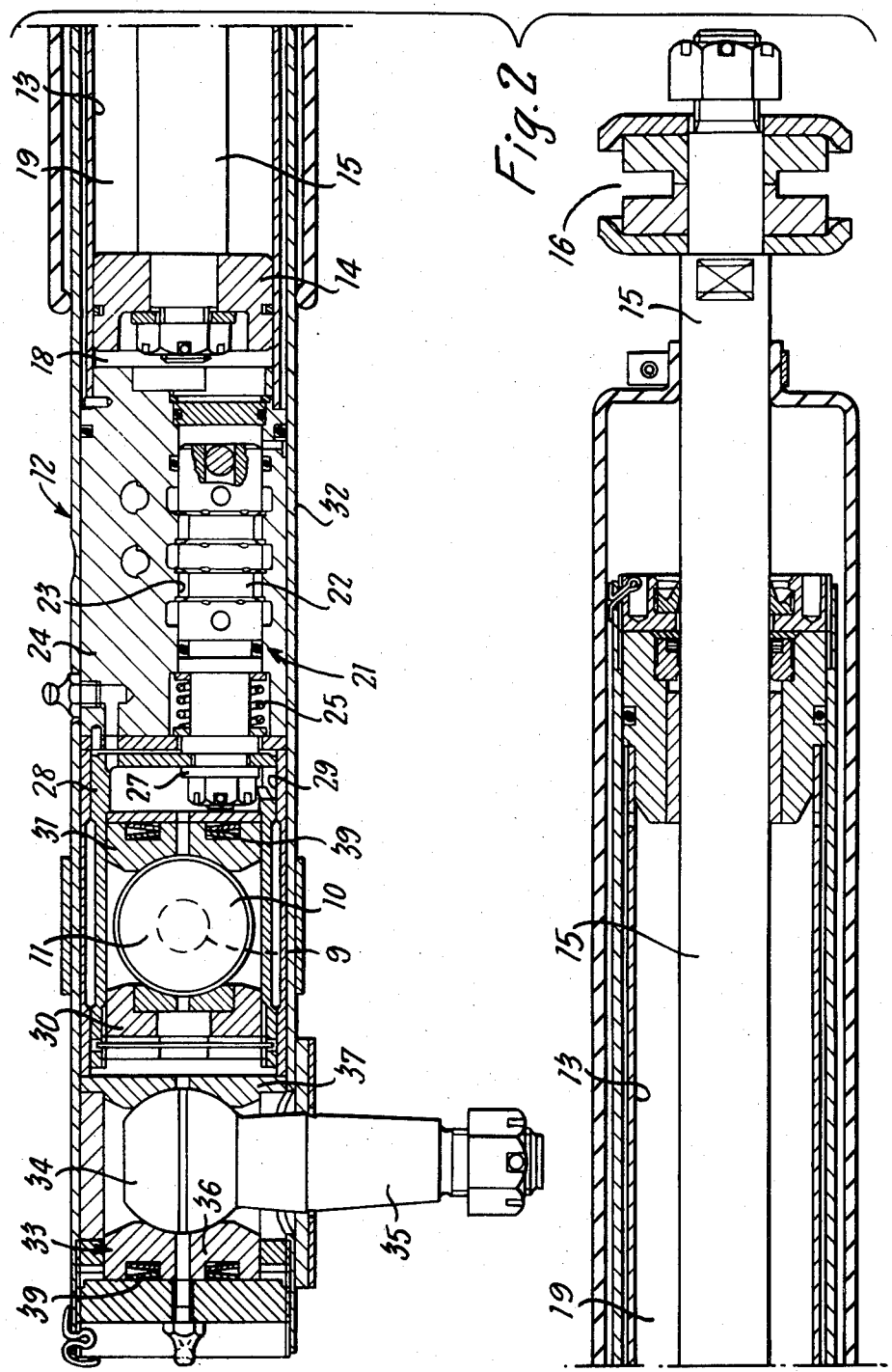
Figure 3:
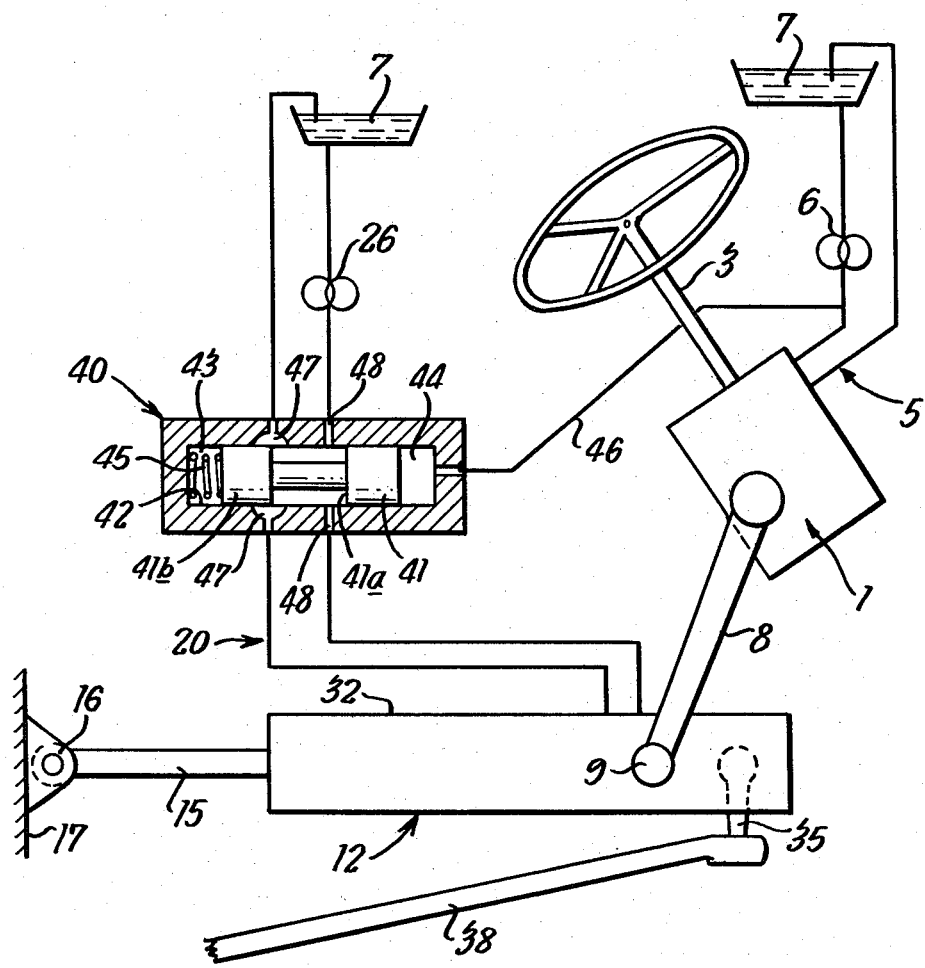

One embodiment of a power assisted steering gear assembly for a wheeled vehicle will now be described, by way of example only, with reference to the accompanying illustrative drawings in which:

FIG. 1 diagrammatically illustrates a general arrangement for the assembly;

FIG. 2 is a longitudinal section through a piston and cylinder device which provides a source of power assistance for the assembly in FIG. 1 and has associated therewith valve means to regulate fluid flow to the piston and cylinder device, and FIG. 3 schematically illustrates a modification which is available for the assembly in FIG. 1.

The power assisted steering gear assembly has a power assisted steering gear 1 which may be of conventional form comprising a recirculating ball nut/piston which is axially slidable within a cylinder in a housing 1a of the gear. The ball nut/piston engages with a worm on a rotatable input shaft 2 so that rotation of the shaft through a steering column 3 and in response to a steering manoeuvre effects axial displacement of the nut/piston. The nut/piston has a toothed rack which engages with a sector or quadrant having an output shaft 4 so that axial displacement of the piston imparts rotation to the shaft 4 in a direction which is dependent upon that in which the piston is displaced. The nut/piston within the gear 1 forms with its cylinder opposed chambers to which fluid under pressure is directed from a primary fluid system 5 under control of an open centre valve which is responsive to rotation of the shaft 2 so that the valve permits the opposed chambers to be exhausted and pressurised to provide power assistance for movement of the piston in accordance with the direction in which steering is to be effected. An example of a power assistance gear 1 is disclosed in U.K. Pat. No. 1,469,734. The primary fluid system 5 includes a constant output engine driven pump 6 (see FIG. 3) which draws hydraulic fluid from a reservoir 7 and, with the valve in its open centre condition, recirculates the fluid to the reservoir.

Coupled for rotation with the output shaft 4 is a displaceable component in the form of a drop arm 8 which is coupled at 9 to the shaft of a ball headed pin 10. The ball end 11 of the pin 10 forms a ball joint coupling with a ram unit 12.

The ram unit 12 defines a cylinder 13 within which is axially displaceable a piston 14 having a piston rod 15 which extends from the ram unit and the outer end thereof is pivotally mounted at 16 to a frame part 17 of the vehicle. The ram unit 12 is intended to provide hydraulic power assistance, or additional assistance, to the steering, and pressure fluid flow to the opposed chambers 18 and 19 formed between the piston 14 and its cylinder 13 is regulated and controlled from a secondary fluid system 20 by a spool valve 21.

The valve 21 has a spool 22 which is axially displaceable in a spool cylinder 23 formed by a housing 24 which is fixed relative to the cylinder 13 and, as shown in FIG. 2, is conveniently mounted coaxial with that cylinder. The spool 22 is spring biased at 25 relative to the housing 24 in both senses of its axial displacement and to a neutral, open centre condition in which condition fluid from a secondary engine driven constant output pump 26 in the system 20 is recirculated to the reservoir 7 (see FIG. 3). Displacement of the spool 22 in one or the other sense of axial direction and from its neutral condition and against the spring biasing 25 controls communication between the chambers 18 and 19 with the output of pump 26 or with the reservoir to displace the piston 14 axially in a direction which is appropriate to assist in a steering manoeuvre and it will be apparent that the spool valve 21 may be regarded in a similar manner to a conventional power assistance control valve. In addition to being open centre, the valve 21 when in its neutral or centre condition opens communication between both chambers 18 and 19 and the reservoir 7.

The spool 22 is connected at 27 for axial displacement with a sleeve 28 which is capable of restricted axial displacement within and relative to a cylinder 29. The cylinder 29 is conveniently coaxial with the cylinder 13 and is fixed relative to the housing 24 (and may be formed as an extension of that housing). Housed within the sleeve 28 for axial displacement in unison therewith are a pair of opposed ball cups 30 and 31 between which is received the ball end 11 of the pin 10 with which they form a ball joint. It will be noted from FIG. 2 that the cylinder 29, housing 24 and cylinder 13 are carried within a tubular housing 32 of the ram unit relative to which housing 32 the piston 14, spool 22 and the ball joint formed within the sleeve 28 are axially displaceable.

Mounted in the tubular housing 32 is a second ball joint 33 formed by a ball end 34 of a pin 35 engaging with opposed ball cup seats 36 and 37 which are secured relative to the tubular housing 32. The pin 35 extends from the housing 32 and is coupled to a drag link 38 of what may be regarded as a conventional form of steering linkage. It will be noted that the ball seatings 31 and 36 are axially spring loaded at 39 to preload the ball joints.

In use of the system as shown in FIGS. 1 and 2 and in response to a steering manoeuvre applied to the input shaft 2, power assistance is provided from the primary fluid system 5 to rotate the drop arm 8 in conventional manner. Rotational displacement of the drop arm in one or the other senses of direction is sensed through the ball joint formed by the pin 10 to react on the sleeve 28. This latter reaction causes the sleeve 28 to be displaced, possibly to the full extent of its restricted displacement, relative to the cylinder 29 and thereby to cause corresponding axial displacement of the spool 22 through the connection 27. Displacement of spool 22 serves to control the flow of fluid under pressure from the secondary fluid system 20 to actuate the piston and cylinder device 14, 13 in a sense to extend or retract the piston rod 15. This latter movement of the piston rod 15 displaces the tubular housing 32 relative to the vehicle frame part 17 and thereby displaces the drag link 38 and the steering linkage in a sense which corresponds to that desired by the steering manoeuvre which is initially applied through the steering column 3. The ram unit 12 can therefore serve to provide power assistance to the steering manoeuvre which is additional to the power assistance provided by the gear 1.

If required the secondary fluid system 20 can be isolated from the primary fluid system 5 in the sense that it can serve essentially as a back-up or emergency source of power assistance should the need arise. Such an arrangement is shown in the modification of FIG. 3 where the secondary system 12 includes an auxilliary valve 40 having a spool 41 with an annular recess 41a axially displaceable in a spool cylinder 42. The spool 41 forms with its cylinder opposed spool chambers 43 and 44 of which chamber 43 houses a spool biasing spring 45 and chamber 44 is in constant communication by way of passage 46 with the output of pump 6 in the primary fluid system 5. The spring 45 is arranged so that when the pump 6 is operating normally, hydraulic pressure in spool chamber 44 which is provided through passage 46 from the pump 6, is sufficient to retain the spool 41 against its spring biasing so that the output from pump 26 communicates by way of recess 41a with the reservoir 7 as shown in FIG. 3 (and in addition both chambers 18 and 19 of the ram unit 12 connect with the reservoir 7 through the secondary fluid system 20 by way of annular recess 41a as shown in FIG. 3). By this arrangement the power assisted steering gear 1 will normally provide the sole power assistance for the steering manoeuvre through rotation of the drop arm 8 displacing the tubular housing 32 and thereby the drag link 38. During this latter displacement of the housing 32 it will be apparent that the piston 14 will be displaced in its cylinder 13 and hydraulic fluid will merely be transferred between the relatively expanding and contracting chambers 18 and 19 through the circuit formed in the secondary system part 20 by way of the recess 41a in spool 41.

In the event that the pump 6 fails or fluid pressure is otherwise lost in the primary fluid system 5, power assistance will be lost to the steering gear 1, however in accordance with conventional practice the gear will still be manually operable to rotationally displace the drop arm 8 in response to rotation of the steering column 3. However, upon loss of fluid pressure in the primary system 5 pressure will be lost in spool chamber 44 so permitting the spool 41 to be displaced rightwardly in FIG. 3 under the biasing of spring 45. Upon such displacement of the spool 41 fluid pressure is made available for operation of the piston and cylinder device 14,13 in the ram unit 12 under control of the spool valve 21. More particularly when the spool 41 is displaced rightwardly under its spring biasing spool, spool 1 and 41b closes annular recess 47 in the spool valve to communication with ports 48 in that valve while those ports 48 are maintained in communication through the annular recess 41a so that the secondary fluid system forms a pressure line from pump 26 to the spool valve 21 in the ram unit through ports 48 and recess 41a and a return line from the spool valve 21 around annular recess 47 to the reservoir 7. While this latter circuit is maintained such rotational displacement which is effected by the drop arm 8 will be sensed to displace the spool 22 and thereby provide power assistance to displacement of the piston 14 as previously described. The ram unit 12 can therefore provide the sole means of power assistance for the steering gear.

Although in the discussion and description of the invention the use of open centre valve arrangements have been assumed it will be understood that closed centre valve arrangements may be employed or even a combination of open and closed centre valve arrangements.

I claim:

1. A power assisted steering gear assembly comprising,
   input means,
   steering linkage means displaceable to provide a steering output in response to a steering input applied to said input means,
   a displaceable component, displacement of which in response to said steering input effects displacement of said linkage means,
   a first power fluid system connected to said displaceable component to provide power assist for the displacement of said displaceable component,
   a second power fluid system connected to said steering linkage means to provide power assist to said steering linkage means,
   said first power fluid system comprising a fluid source and a fluid pressure operated means associated with said displaceable component and said second power fluid system comprising a fluid source and a fluid pressure operated means associated with said steering linkage and
   an auxiliary valve means located in one of said first and second power fluid systems and controlling fluid flow from the power source to the fluid pressure operated means in said one of said first and second power fluid systems in response to the pressure of the fluid flow in the other of said first and second power fluid system so as to render ineffective power assist from said one of said first and second fluid power systems when said pressure in said other of said first and second power fluid systems exceeds a predetermined amount, and to provide power assist from said one of said first and second power fluid systems when said pressure in said other of said first and second power fluid systems is below a predetermined amount or ceased to exist.

2. A power assisted steering gear assembly as set forth in claim 1 wherein said other of said first and second power fluid systems is actuated by a steering input applied to said input means, and said one of said first and second power fluid systems is actuated automatically in response to pressure drop in said other system below a predetermined minimum.

3. A power assisted steering gear assembly as set forth in claim 1 wherein said auxiliary valve means includes a spring biased valve component displaceable against the spring bias by fluid pressure in said other of said first and second fluid power system.

4. A power assisted steering assembly as set forth in claim 1 or 2 wherein said displaceable component includes a drop arm operatively connected to said steering linkage.

5. A power assisted steering gear assembly as set forth in claim 1 or 2 wherein said fluid pressure operated means in said first fluid system comprises a double acting piston and a cylinder device fluid flow to and from opposed chambers of which provides power assist to displacement of said drop arm.

6. A power assisted steering gear assembly comprising,
   input means,
   steering linkage means displaceable to provide a steering output in response to a steering input applied to said input means,
   a first power fluid system connected to said steering linkage means to provide power assist for the displacement of said steering linkage means,
   a second power fluid system connected to said steering linkage means to provide power assist to said steering linkage means,
   each of said first and second power fluid systems comprising a pump and a fluid pressure operated means connected with said linkage means, and an auxiliary valve located in said second power fluid system for controlling fluid flow from the pump to the fluid pressure operated means in said second power fluid system, said auxiliary valve comprising a spring biased valve spool displaceable against spring bias by fluid pressure of the fluid flow from the pump to the fluid pressure operated means in said first power fluid system to cut the fluid flow from the pump to the fluid pressure operated means in said second power system when said fluid pressure in said first power fluid system exceeds a predetermined amount, and to allow fluid flow from the pump to the fluid pressure operated means in said second power fluid system when said fluid pressure in said first power fluid system falls below a predetermined amount or ceased to exist.

7. A power assisted steering gear assembly as set forth in claim 6 wherein said first power fluid system provides power assist for displacement of a drop arm which is operatively connected to said steering linkage means to effect displacement thereof, and said second power fluid system provides power assist to displacement of said steering linkage means when said first power fluid system becomes at least partially inoperative.

8. A power assisted steering gear assembly as set forth in claim 6 wherein said drop arm is rotationally displaceable.

9. A power assisted steering gear assembly as set forth in claims 6 or 7 wherein said fluid pressure operated means of said second power fluid system comprises a ram, and said drop arm is connected to said ram to effect displacement of said steering linkage means.

10. A power assisted steering gear assembly as set forth in claim 8 wherein said second power fluid system provides power assist to displacement of said ram when said first fluid power system fails to provide power assist to displacement of said drop arm.

* * * * *